July 21, 1953 L. M. BROOKS 2,645,987
CULTIVATOR
Filed Sept. 13, 1948 2 Sheets-Sheet 1
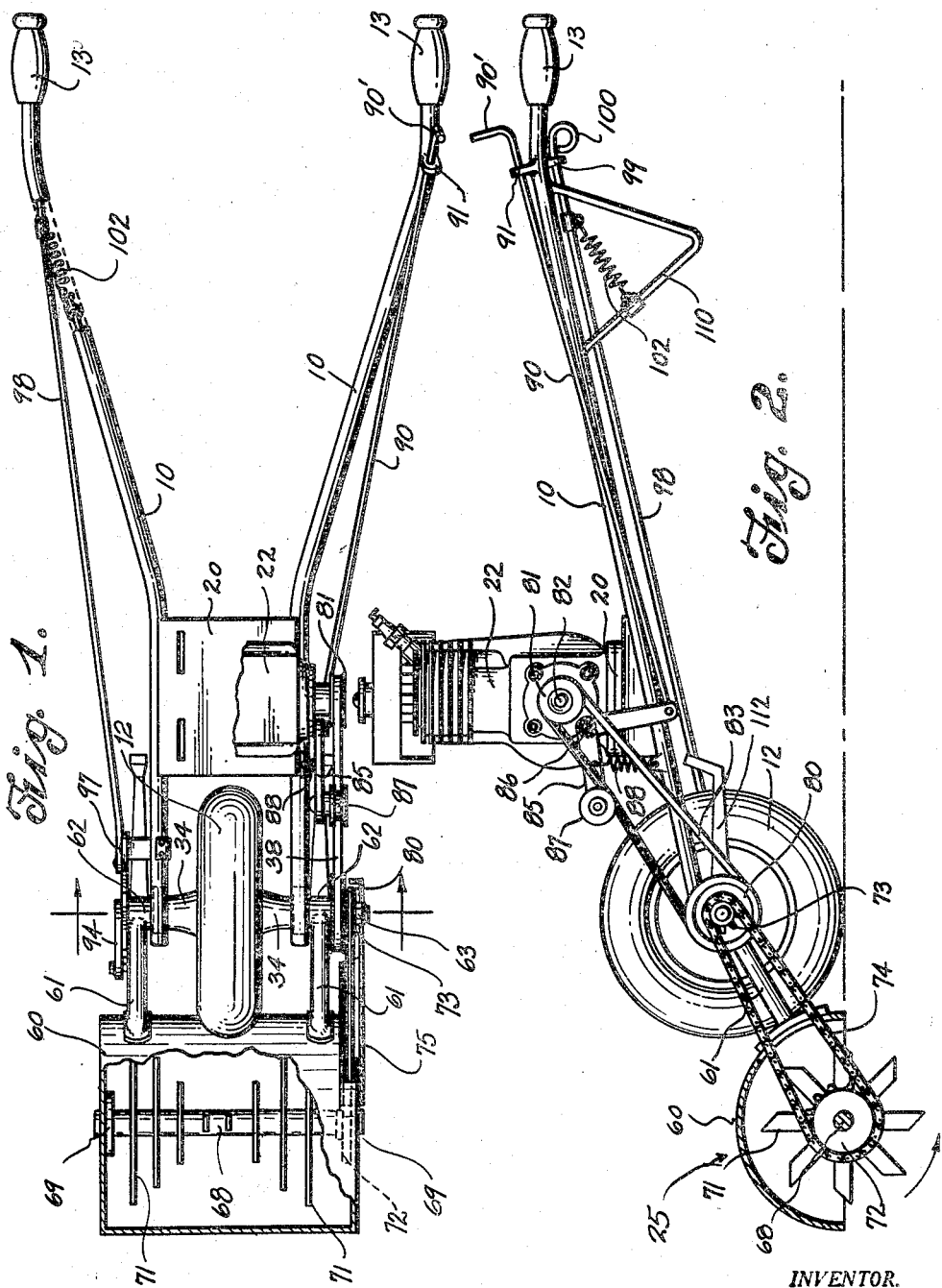
INVENTOR.
LESTER M. BROOKS
BY
Cook Robinson
ATTORNEYS July 21, 1953 — L. M. BROOKS — 2,645,987
CULTIVATOR
Filed Sept. 13, 1948 — 2 Sheets-Sheet 2
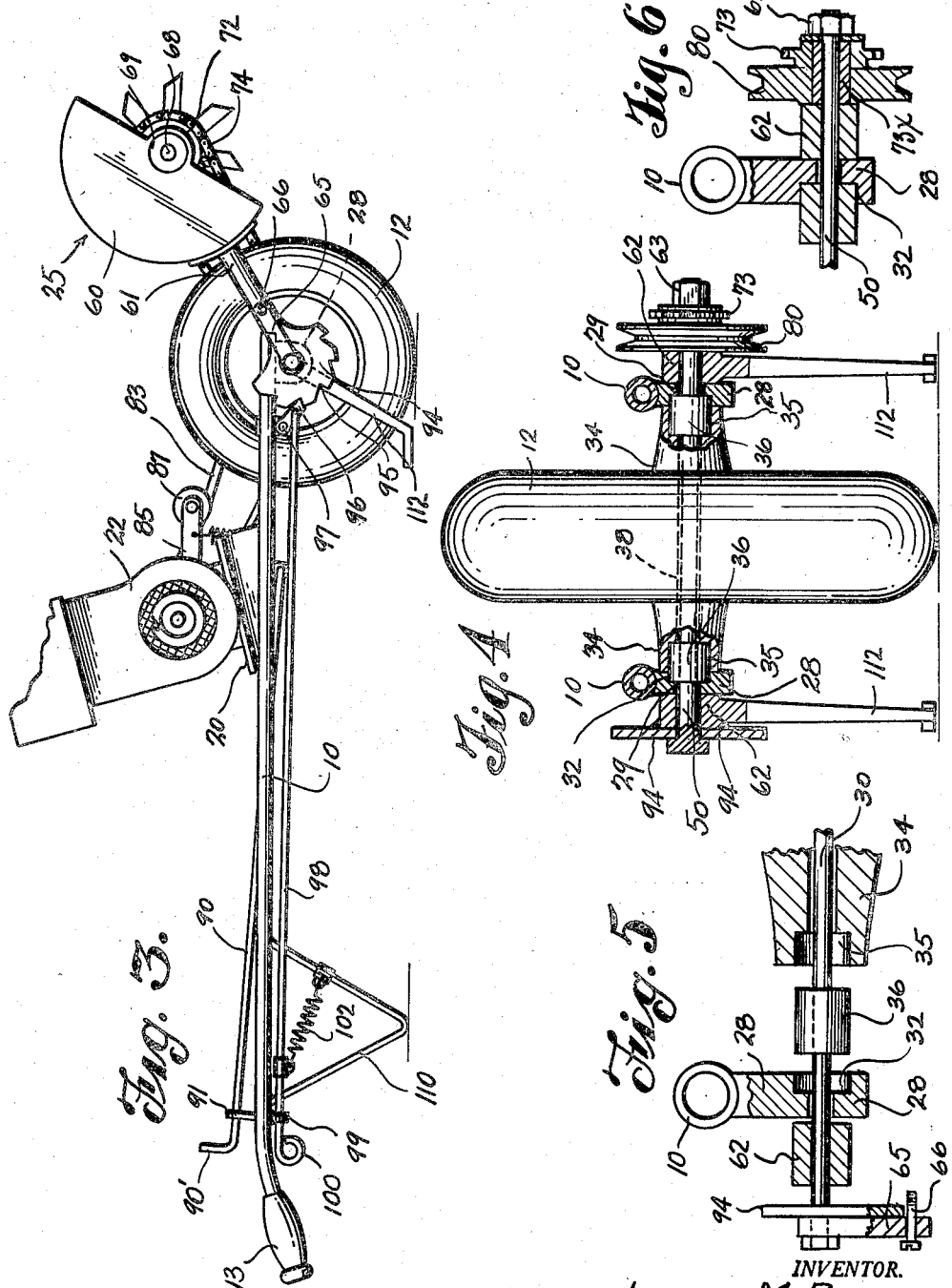
INVENTOR.
LESTER M. BROOKS
BY Cook & Robinson
ATTORNEYS Patented July 21, 1953

2,645,987

UNITED STATES PATENT OFFICE 2,645,987

CULTIVATOR

Lester M. Brooks, Seattle, Wash.

Application September 13, 1948, Serial No. 49,031

5 Claims. (Cl. 97—40)

This invention relates to that class of devices known generally as "cultivators." More particularly, it has reference to a power-driven, hand-controlled implement of a "walking" type for ground cultivation, grass cutting, and various analogous uses, that is especially designed for operations where the larger and heavier machines are not practical or economical to use.

It is the principal object of this invention to provide a light-weight, hand-controlled, power-equipped implement designed primarily for the cultivation or tilling of the soil, and wherein provision is made for the detachment of the soil-tilling device or tool and the use interchangeably therewith, and in a like or similar manner, of other devices or tools such as, for example, a grass mower, or weeder, or a seeder.

Yet another object of the invention is to provide an implement, of the above kind, supported at its forward end by a single ground wheel, and which is operatively supported, guided and controlled through the mediacy of a pair of rearwardly extending hand levers which the operator grasps after the fashion of supporting and guiding the ordinary type of wheelbarrow. Furthermore, a device wherein the arrangement of parts, as supported by the ground wheel, is such that the weight of the engine and that of the driven tool are to a certain extent counterbalanced by each other and the operator, in supporting the device by the handles, is thereby relieved of a substantial amount of the weight.

Still another object of the invention is to provide a hand-controlled device, as above stated, wherein attachment device, for example, the ground-working device, or mower or weeder, is operatively attached to the main frame, forwardly of the ground wheel, and is swingingly adjustable about the axial line of the wheel, and an interlock is provided for between the main frame and the frame portion of the attached device whereby the operator may effect the lifting or lowering of the attached device by a raising or lowering of the hand levers, and also can positively control its working elevation.

Another object of the invention is to provide novel means of lateral support for the implement when it is rested on the ground.

Still further objects of the invention reside in the novel means for mounting the ground wheel and in the means for attachment of the driven tool that permits of its easy and ready detachment without dismounting the wheel from the main frame.

In accomplishing the above mentioned and other objects of the invention, I have provided the improved details of construction, the preferred forms of which are illustrated in the accompanying drawings, wherein:

Fig. 1 is a top or plan view of an implement embodying the improvements of the present invention therein, certain parts thereof being broken away for better illustration of details of construction.

Fig. 2 is a side view of the same, showing the ground-working implement in fully lowered position and the hand levers in a normal position of support during use of the implement.

Fig. 3 is a view of the implement as seen from the side that is opposite that shown in Fig. 2, and with the handle levers lowered and the attached device disposed in a raised position.

Fig. 4 is a detail showing the means for and manner of mounting the ground wheel in the main frame structure.

Fig. 5 is a sectional detail of certain parts of the ground wheel mounting members in a disassembled relationship for explanatory purposes.

Fig. 6 is a sectional detail showing the sprocket and belt wheels as mounted by the tie bolt.

Referring more in detail to the drawings:

In its preferred form of construction, the present device comprises a main frame structure including a pair of handle levers, or bars, 10—10, which, as noted best in Fig. 1, are coextensive and are symmetrically disposed at opposite sides of the central, longitudinal, vertical plane of the implement. At their forward ends, the handle levers are supported by a ground wheel 12, that is located between them and functionally mounted as presently fully explained. These handle bars extend rearwardly from the wheel in parallel relationship for a short distance, as noted in Fig. 1, then diverge gradually and symmetrically to their rearward ends where they are equipped with suitable hand grip members 13—13. At their rearward ends these handle levers are spaced apart a distance that is best for the intended use of the implement, that is, a distance of about twenty-six inches. The wheel 12, preferably, is equipped with a pneumatic tire as shown, and is about sixteen inches in outside diameter. The overall length of the implement, as designed for ordinary use, is about eighty inches. However, these dimensions may be varied as required or as desired for any specific use.

Mounted rigidly upon and extended between the handle levers 10—10, just rearward of the ground wheel 12, is a plate or platform 20 on which a small, internal combustion engine 22 is fixedly mounted for use as presently explained. Forwardly of the ground wheel is a tool or device, designated generally by numeral 25, that is typical of those devices that may be interchangeably used with the present implement. The manner of mounting the wheel 12 and the ground-working device, or tool, 25 will now be described.

Fixed to the two handle levers 10—10, at their forward ends and at the under side thereof, are lugs 28—28. Preferably these lugs are welded to the handle levers which, as noted best in Fig. 4, are of tubular form, but not necessarily so. The lugs as fixed to the levers are transversely aligned and have holes 29 therethrough, as shown in Fig. 4, for the passage of a tie bolt 30. Also, the lugs are counter-bored at their inside surfaces, coaxial of the holes 29, to provide each with a socket 32, as understood best by reference to Figs. 4, 5 and 6. The wheel 12 is equipped at opposite sides with trunnion-like hub portions 34—34 that extend to opposite sides of the wheel, and which are socketed at their ends, as at 35 in Fig. 5. Short, cylindrical bearings 36—36, which may be sleeves as shown or ball or roller bearings, are fitted in these sockets and in the corresponding sockets 32 of the lugs 28—28 as seen in Fig. 4, thus to mount the wheel. The structure, with wheel 12 thus mounted therein, is then secured by application of the tie bolt 30, which is extended through the lugs 28—28, also through the bearings 36—36 and a bore 38 that is coaxially of the wheel 12. This tie bolt also mounts the tool that is disposed forwardly of the wheel, as presently explained.

The soil-tilling, or other device that is designated generally by numeral 25, comprises a rigid frame structure comprising a semi-cylindrical, downwardly-facing hood 60 supported directly in front of the wheel 12 and transversely thereof by a pair of lever arms 61—61 which have their forward ends welded or otherwise rigidly fixed to the hood, as best shown in Figs. 1 and 2, and which are equipped at their rearward ends, with bearings 62—62, disposed just outside the lugs 28—28 and receiving the opposite end portions of the tie bolt 30 pivotally therethrough so that the device 25 may have an up-and-down swinging adjustment relative to the main frame.

It is shown in Fig. 4 that the tie bolt 30 is secured in place by a nut 63 that is threaded onto one end thereof. At its other end, the bolt has a short handle or arm 65 fixed thereto serving as a head. The arm 65 extends along the adjacent lever 61 and is detachably secured thereto by a screw 66. When it is desired to detach the implement 25, the nut 63 is first removed from the bolt 30, then the screw 66 is taken out and the arm 65 used as a handle whereby the tie bolt may be pulled out. This detaches the device 25 but does not dismount the wheel 12, since this will be held in place by the bearings 36. Should it be desired to dismount the wheel 12, this can be done, however, by merely springing the frame members 10—10 apart as may be required to unseat the bearings from the sockets in lugs 28—28.

The device 25 is here illustrated as a rotating soil tiller. It includes a central drive shaft 68 that extends from end to end of the hood, and is revolubly mounted at its ends in bearings 69—69 fixed to the end walls of the hood. Extending radially from the shaft 68 are ground-working teeth 71 which may be of any suitable form and arrangement. Fixed on the shaft 68 at one end is a sprocket wheel 72 and this is aligned with a sprocket wheel 73 mounted to revolve on a bushing 72x fitted about an end portion of the tie rod 30, between the nut 63 and the adjacent bearing 62, as shown in Fig. 4. A sprocket chain belt 74 operates about the aligned sprockets 72 and 73 and preferably this chain and the sprockets are enclosed in a housing which has been shown at 75 in Fig. 1, but omitted from other views for better showing of parts enclosed thereby.

Fixed coaxially to the sprocket wheel 73, as has been shown in Figs. 4 and 6, is a V-belt pulley 80, and this is aligned with a V-belt pulley 81 of lesser diameter fixed on the drive shaft 82 of the engine 22, as shown in Fig. 2. A V-belt operates about the pulleys 81 and 82 and is normally kept sufficiently taut, by an adjustable belt tightener, to effect a driving connection. The belt tightener, as shown in Figs. 1 and 2, comprises a bell-crank lever 85 pivoted on the engine frame as at 86. On one arm of the bell-crank is a wheel 87 that engages the top run of the belt to control its degree of tightness. A coiled spring 88, seen in Fig. 2, is attached to the adjacent lever 10 and to the bell crank to normally draw wheel 87 against the belt to keep it taut. A release rod 90 is attached at one end to the other arm of the bell crank 85 and extends along the handle lever 10 to adjacent its hand grip portion 13, where it extends through a supporting ear 91 on the lever 10. The rear end of the release rod has a laterally turned portion 90' whereby the operator may, by means of the same hand that holds the adjacent grip 13, actuate the rod in a way to move the bell crank to remove pressure of the wheel 87 from the belt 83, thus to discontinue the driving of the soil-tilling tool by the belt.

In operation, the shaft 68 revolves in the direction indicated by the arrow adjacent thereto in Fig. 2, and by reason of this, the teeth 71 will act on the ground to pull the device forwardly without requiring any particular amount of effort on the part of the user. However, the tool automatically stops its forward pull if held against advancement for an interval sufficient to permit the teeth to pulverize the ground in which they are working.

If the operator at any time desires to adjust the elevation of or to lift the ground-tilling implement out of the ground, this is made possible by the frame interlocking means shown best in Fig. 3, wherein it is shown that a segment 94 is welded or otherwise fixed to the inside of the adjacent bearing 62 of an arm 61, to rotate about the tie bolt 30 with the up-and-down movement of frame of the attached implement or tool 25. This segment is equipped with a plurality of ratchet notches 95 with which a locking pawl 96, pivoted to a lug 97 on the under side of the adjacent lever 10, may be selectively engaged. A pull rod 98 extends from the pawl along the adjacent handle 10, to the hand-grip portion 13 thereof and there extends slidably through a supporting ear 99. A loop 100 is formed at the end of this rod to receive a finger of the hand as applied to the hand grip. A coiled spring 102 is attached under tension to the rod 98 and to a part of the main frame to normally urge the rod 98 forwardly and the pawl pressed against the notched segment as in Fig. 3.

Assuming the parts to be in use as shown in Fig. 2, should the operator wish to raise the device 25 from the ground, he merely lifts the handles 10—10 upwardly from position shown to about a sixty-degree angle, then pushes them downwardly. The pawl 96 will, upon lifting the levers, ratchet over the segment and be engaged in a notch of the segment as shown in Fig. 3, and when the handle levers are then pushed downwardly, the implement 25 will be lifted to a position above the ground surface.

The notched segment also serves as a means whereby the tool may be held at any desired working level, and this adjustment can be best made by resting the tool on the ground, then lifting the handles and engaging the pawl in a notch that will support the tool at the level desired.

As a matter of convenience, the handle levers 10—10 are each equipped near the hand hold portions with short supporting legs as at 110. Also, as noted best in Figs. 2 and 3, legs 112 are fixed to the bearings 62—62 to extend downwardly therefrom. The relationship of these legs to the arms 61—61 is such that when the tool 25 is in a working position, as in Fig. 2, they will be held substantially above the ground. However, when the device 25 is swung up to an elevated or lifted position, and the legs 110 are rested on the ground, the legs 112 will then be brought into position for supporting contact with the ground, as has been shown in Fig. 3.

It is anticipated that other devices, similar to that designated by numeral 25, may be used interchangeably therewith. Such other device would have mounting arms like or similar to the arms 61—61, and in the event of its being a grass cutter or lawn mower, would have a drive shaft similar to shaft 68 and similarly mounted and driven.

Whatever tools or devices are used interchangeably with the cultivator that is here shown, would be of a like type in so far as mounting control and driving is concerned.

In view of the fact that the present invention contemplates the interchangeable use of various devices forwardly of the supporting ground wheel, each of which will have a supporting frame similar to that here shown in connection with the rotary ground tilling device, and each will have a drive shaft extended to the side of its carrier frame, I have in the claims which terminate this specification, referred to that frame which is forwardly of the ground wheel, as a "tool carrier frame" and the device which is mounted thereon as a "tool," with the understanding that the term "tool" has reference to any device which may be employed, such as a cultivator, mower, weeder, seeder or other mechanism, adapted to be driven by the shaft 68 or one corresponding thereto.

Implements of this kind are easy to handle, effective in use and relatively inexpensive.

Having thus described my invention, what I claim as new therein and desire to secure by Letters Patent is:

1. An implement of the character described comprising a main frame structure, including a pair of longitudinally extending and laterally spaced handle levers for the guidance and control of the implement in use, a supporting ground wheel mounted between the levers at their forward ends, a tool carrier frame disposed forwardly of the wheel and supported from the main frame for up-and-down swinging adjustment about the wheel axis, a tool mounted in the said tool carrier frame having a drive shaft, an engine mounted on the main frame, a driving connection between the engine and the said drive shaft of the said tool, and a releasable means for effecting a rigid connection between the main frame and tool carrier frame whereby the tool carrier frame may be sustained at a selected operating distance above the ground through the mediacy of the handles.

2. In a device of the character described, a frame structure comprising laterally spaced members, a supporting ground wheel mounted between said members, a tool carrier frame forwardly of the wheel and having a pair of attaching arms extended rearwardly from opposite sides thereof and pivotally attached to the main frame at opposite sides of the wheel for upward and downward swinging adjustment of the tool frame, means for effecting a locked connection between the main frame and said arms for adjustable support of the tool frame above the ground and legs attached to the said arms and movable into and from supporting contact with the ground by lifting and lowering adjustments of the tool frame relative to the main frame.

3. A device of the character described comprising a main frame structure including a pair of laterally spaced handle levers, a tie bolt extended between said levers at their forward ends, a supporting ground wheel disposed between the levers and revoluble about the tie bolt, a tool frame disposed forwardly of the ground wheel, having a pair of supporting arms pivoted at their rearward ends on said tie bolt at opposite sides of the wheel, means for effecting a locked connection between the main frame and tool frame for support of the tool frame in a raised position, supporting legs fixed to the said arms of the tool frame and adapted to be brought into and from supporting contact with the ground by the adjustment of the tool frame between raised and lowered positions.

4. An implement of the character described comprising a main frame structure including a pair of longitudinally extending handle levers for the manual support of the implement at its rearward end, a transverse tie bolt mounted by and extended between the levers at their forward ends, a supporting ground wheel rotatably mounted on said tie bolt between the said handle levers, a tool carrier frame disposed forwardly of the wheel having a pair of supporting arms pivotally mounted at their rear ends on said tie bolt at opposite sides of the said wheel, a tool mounted on the tool carrier frame having a drive shaft extended to a side thereof, an engine on the main frame having a drive shaft, a sprocket wheel on the tool shaft, a belt wheel on the engine shaft, a sprocket wheel and a belt wheel coaxially joined and revoluble on the tie bolt and aligned, respectively, with the sprocket wheel on the tool driving shaft and belt wheel on the engine shaft, a belt operatively applied about the aligned belt wheels and a sprocket chain belt operatively applied about the aligned sprocket wheels.

5. A device as in claim 4 including also a notched segment fixed to a supporting arm of the tool carrier frame concentric with the axis of the tie rod, a pawl pivoted on the main frame for one-way ratcheting engagement with the notched segment and selectively engageable with the notches for effecting a positive connection through which the working elevation of the tool may be determined and sustained through the mediacy of the handle levers, and a means adjacent the hand grip portions of one of the handle levers for disengaging the pawl from the segment.

LESTER M. BROOKS.

References Cited in the file of this patent

UNITED STATES PATENTS

| Number | Name | Date |
|---|---|---|
| 507,068 | Elliott | Oct. 17, 1893 |
| 1,020,461 | Smith | Mar. 19, 1912 |
| 1,383,294 | Gardner | July 5, 1921 |
| 1,550,291 | Stull et al. | Aug. 18, 1925 |
| 2,317,188 | Hanson | Apr. 20, 1943 |
| 2,368,290 | Donald | Jan. 30, 1945 |